United States Patent
Matsuura

Patent Number: 5,116,786
Date of Patent: May 26, 1992

[54] LOW TEMPERATURE SEALING GLASS COMPOSITION

[75] Inventor: Ichiro Matsuura, Otsu, Japan

[73] Assignee: Nippon Electric Glass Co., Ltd., Otsu, Japan

[21] Appl. No.: 793,221

[22] Filed: Nov. 7, 1991

Related U.S. Application Data

[63] Continuation of Ser. No. 651,784, Feb. 7, 1991, abandoned.

[30] Foreign Application Priority Data

Feb. 9, 1990 [JP] Japan ................ 2-30225

[51] Int. Cl.$^5$ .......................... C03C 3/12; C03C 8/24; C03C 14/00
[52] U.S. Cl. ........................ 501/15; 501/32; 501/41
[58] Field of Search ................ 501/15, 32, 41

[56] References Cited

U.S. PATENT DOCUMENTS

| | | | |
|---|---|---|---|
| 3,885,975 | 5/1975 | Malmondier et al. | 501/41 |
| 4,743,302 | 5/1988 | Dumosnil et al. | 501/41 |

FOREIGN PATENT DOCUMENTS

| | | | |
|---|---|---|---|
| 1138150 | 5/1989 | Japan | 501/41 |
| 736073 | 8/1955 | United Kingdom | 501/41 |

Primary Examiner—Mark L. Bell
Attorney, Agent, or Firm—Collard, Roe & Galgano

[57] ABSTRACT

A low temperature sealing glass composition comprises a glass powder comprising 20 to 55 wt. % of PbO, 20 to 55 wt. % of $V_2O_5$, 5 to 40 wt. % of $TeO_2$, and 0 to 8 wt. % of $Al_2O_3$ or (i) 50 to 80 vol. % of a glass powder comprising 20 to 55 wt. % of PbO, 20 to 55 wt. % of $V_2O_5$, 5 to 40 wt. % of $TeO_2$, and 0 to 8 wt. % of $Al_2O_3$, and (ii) 20 to 50 vol. % of low thermal expansion ceramic fillers.

3 Claims, No Drawings

2

LOW TEMPERATURE SEALING GLASS COMPOSITION

This is a continuation of copending application Ser. No. 07/651/784 filed on Feb. 7, 1991, now abandoned.

BACKGROUND OF THE INVENTION

1) Field of the Invention

The present invention relates to a low temperature sealing glass composition, and more particularly to a low temperature sealing glass composition suitable for hermetic sealing for ceramic packages, display devices, and the like.

2) Description of the Prior Art

Conventionally, various types of hermetic sealing materials for ceramic packages, display devces, and the like, such as a sealing material formed from a low melting glass powder, or such a glass powder mixed with a low thermal expansion, ceramic fillers to provide a sealing material with reduced expansion and increased strength, are conventionally known. $PbO-B_2O_3$ based glass powder, and the $PbO-B_2O_3$ based glass powder mixed with a low thermal expansion, ceramc fillers, are widely used at the present time as the sealing materials of the above-mentioned type. However, it is very difficult to prepare suoh a material with a sealing temperature of 400° C. or less, therefore these sealing materials cannot be used with a ceramic package which must be sealed below 400° C. when containing a heat sensitive element such as a highly integrated IC or a special crystal oscllator or the like.

Recently, because of this situation, efforts are being made to develop sealing materials with a sealing temperature of 400° C. or less, centered around a sealng material made from a $PbO-B_2O_3-Tl_2O$ based or a $PbO-B_2O_3-F_2$ based glass powder, and these types of glass powders mixed with a low thermal expansion, ceramic fillers. The sealing temperature of each of these sealing materials is around 380° C., but when using a sealing material made from the $PbO-B_2O_3-Tl_2O$ based glass powder or the $PbO-B_2O_3-Tl_2O$ based glass powder mixed with a low thermal expansion ceramic fillers, special equipment is necessary to prevent scattering of dust during the manufacturing or sealing operations because $Tl_2O$ is a toxic substance. When a sealing material made from the $PbO-B_2O_3-F_2$ based glass powder or the $PbO-B_2O_3-F_2$ based glass powder mixed with low thermal expansion ceramic fillers is used, the electrical resistance deteriorates resulting in poor reliability. In addition, when this material is used to seal a display device such as CRT and Vacuum Fluorescent Display (VFD), the $F_2$ gas released during sealing causes breakdown of the cathode material. Sealing materials made from a $PbO-V_2O_5-Bi_2O_3$ based glass powder or the $PbO-V_2O_5-Bi_2O_3$ based glass powder mixed with ° low thermal expansion ceramic fillers, as disclosed in U.S. Pat. No. 4,743,302, have a lower sealing temperature than the previously mentioned $PbO-B_2O_3-Tl_2O$ based sealing materials and $PbO-B_2O_3-F_2$ based sealing materials. Specifcally, sealing is possible at 370° C. or lower. These sealing materials have extremely low sealing temperatures, but there is a strong tendency toward crystallization, so that on heating, crystallization occurs and the flowability becomes poor. Therefore these materials exhibit the drawback that unless a suitabe oad is applied during sealng, a desirable sealed member cannot be obtaned.

SUMMARY OF THE INVENTION

Accordingly, an object of the present invention is to provide, with due consideration to the drawbacks of such conventional sealing glass compositions, a low temperature sealing glass compositlon comprising a vitreous glass powder with an extremely low sealing temperature.

Another object of the present invention is to provide a low temperature sealing glass composition which can seal a ceramic package or a display device or the like at a temperature below 370° C. without the application of a load.

These objects of the present invention can be achieved by a sealing glass composition comprising a glass powder comprising 20 to 55 wt. % of PbO, 20 to 55 wt. % of $V_2O_5$, 5 to 40 wt. % of $TeO_2$, and 0 to 8 wt. % of $Al_2O_3$ or by a sealing glass composition comprising (i) 50 to 80 vol. % of a glass powder comprising 20 to 55 wt. % of PbO, 20 to 55 wt. % of $V_2O_5$, 5 to 40 wt. % of $TeO_2$, and 0 to 8 wt. % of $Al_2O_3$, and (ii) 20 to 50 vol. % of low thermal expansion ceramic fillers.

DETAILED DESCRIPTION OF THE PREFERRED EMBODIMENTS

As a result of intensive research undertaken by the inventor of the present invention to achieve these objects, a $PbO-V_2O_5-TeO_2$ based glass powder has been discovered which has an extremely low sealing temperature and no tendency to crystallze. When a suitable percentage of low thermal expansion ceramic fillers is mixed with this glass powder it is possible to adjust the coefficient of thermal expansion to match that of a ceramic package or display device.

A low temperature sealing glass composition according to the present invention comprises a glass powder comprising 20 to 55 wt. % of PbO, 20 to 55 wt. % of $V_2O_5$, 5 to 40 wt. % of $TeO_2$, and 0 to 8 wt. % of $Al_2O_3$, preferably 25 to 50 wt. % of PbO, 25 to 50 wt. % of $V_2O_5$, 10 to 35 wt. % of $TeO_2$, and 0.5 to 7 wt. % of $Al_2O_3$.

Furthermore, a low temperature sealing glass composition according to the present invention may comprise (i) 50 to 80 vol. % of a glass powder comprising 20 to 55 wt. % of PbO, 20 to 55 wt. % of $V_2O_5$, 5 to 40 wt. % of $TeO_2$, and 0 to 8 wt. % of $Al_2O_3$, preferably 25 to 50 wt. % of PbO, 25 to 50 wt. % of $V_2O_5$, 10 to 35 wt. % of $TeO_2$, and 0.5 to 7 wt. % of $Al_2O_3$, and (ii) 20 to 50 vol. % of low thermal expansion ceramic fillers.

The reasons for the limitations on the composition of the glass powder and the low temperature sealing glass composition of the present invention are as follows.

If the PbO content is less than 20 wt. %, the glass will not flow satisfactorily at a temperature of 370° C. or less. If the PbO content is more than 55 wt. %, crystallization occurs during sealing and the composition will not flow.

If the $V_2O_5$ content is less than 20 wt. %, vitrification is difficult. If the $V_2O_5$ content is more than 55 wt. %, crystallization occurs during sealing and the composition will not flow.

If the $TeO_2$ content is less than 5 wt. %, crystallization occurs during sealing and the composition will not flow. If the $TeO_2$ content is more than 40 wt. %, devitrification occurs when the molten glass is being cast.

$Al_2O_3$ is effective n preventing devitrification. If the $Al_2O_3$ content exceeds 8 wt. %, the viscosity of the glass is high and the flow is inadequate at a temperature of 370° C. or less.

Other components can be included in addition to those mentioned above. These include, for example, ZnO, $Bi_2O_3$, and $P_2O_5$ at 10 wt. % or less, and $Cu_2O$, $WO_3$, $B_2O_3$, $SiO_2$, $Mo_2O_3$, $Nb_2O_5$, $Fe_2O_3$, $ZrO_2$, SrO, and BaO, at 5 wt. % or less.

Because a glass powder with the above components is vitreous and shows no tendency toward crystallization during sealing, its flowability is good. In addition, because the transformation point and softening point are extremely low, in the range of 250° C. to 285° C., and 290° C. to 325° C., respectively, a sealing glass composition is obtained which is particularly suited to low temperature sealing. However, the coefficient of thermal expansion of this composition is 100 to $120 \times 10^{-7}/°$ C. which is comparatively high in comparison with the coeffcients of thermal expansion of alumina and window glass plate, which are $70 \times 10^{-7}/°$ C. and $85 \times 10^{-7}/°$ C., respectively. It is therefore necessary to adjust the coefficient of thermal expansion of the sealing composition to use with these materials—specifically, to seal a ceramic package or a display device or the like.

The low temperature sealing glass composition of the present invention can be adjusted to provide a coefficient of thermal expansion suitable for sealing a ceramic package or a display device or the like by blending in one or more types of low thermal expansion ceramic fillers, in amounts within the above-mentioned ranges.

Examples of low thermal expansion ceramic filers which can be given include $PbTiO_3$, $Pb_{0.75}.Ca_{0.25}.TiO_3$, $Pb.Ti_{0.7}.Fe_{0.2}.W_{0.1}.O_3$, $SiZrO_4$, $Pb.Ti_{0.5}.Fe_{0.25}.Nb_{0.25}.O_3$, $0.99SnO_2.0.01ZnO$. However, if less than 20% by volume of these low thermal expansion ceramic fillers is added, no effect is obtained; if more than 50% by volume is added, the flowability is poor, and sealing is not possible at 370° C. or less.

A method of producing the low temperature sealing glass composition of the present invention will now be described. First, a mixture of the necessary raw component materials is prepared and melted by heating at 800° C. to 1000° C. for 0.5 to 2 hours, after which it is formed into a plate. The plate is then pulvarized to a powder in a ball mill or the like, then classified to obtain a glass powder of the desired particle size. The glass powder obtained in this manner can be mixed with a specified percentage of low thermal expansion ceramic fillers as required.

The present invention will now be explained in detail with reference to the following examples. which are given for illustration of the invention and are not intended to be limiting thereof.

EXAMPLE 1

A mixture of 39.5 wt. % of PbO, 39.5 wt. % of $V_2O_5$, 20 wt. % of $TeO_2$, and 1 wt. % of $Al_2O_3$ was placed in a platinum crucible, heated to 900° C. in an electrc furnace, melted over one hour, and formed into a thn plate. This plate was ground to powder with alumina balls in a ball mill and passed through a 150 mesh stainless steel screen, whereby a sealing glass composition No. 1-1 according to the present invention was obtained.

The thus obtained sealing glass composition No. 1-1 has a transformation point of 260° C., a softening point of 295° C., and a coefficient of thermal expansion of $108 \times 10^{-7}/°$ C. The flowability of the glass powder A was excellent, which is denoted by "o" in TABLE 1. This indicates a complete absence of crystallization in the sealing glass composition No. 1 and good sealing characteristics of the sealing glass composition No. 1.

EXAMPLES 2 to 13

The procedure for Example 1 was repeated except that the formulation of each glass powder was replaced the formulation as set forth in TABLE 1, whereby sealing glass composition Nos. 1-2 to 1-13 according to the present invention were obtained.

Each of the sealing glass compositions No. 1-1 to No. 1-13 exhibited a low transformation point and a low softening point, in the 260° C. to 281° C. range and 295° C. to 325° C. range, respectively, and the flowability was judged to be good for all examples. This indicates a complete absence of crystallization and good sealing characteristics. The coefficient of thermal expansion of each sample was in the 102 to $117 \times 10^{-7}/°$ C. range

TABLE 1

| Compositions | 1-1 | 1-2 | 1-3 | 1-4 | 1-5 | 1-6 | 1-7 | 1-8 | 1-9 | 1-10 | 1-11 | 1-12 | 1-13 |
|---|---|---|---|---|---|---|---|---|---|---|---|---|---|
| PbO | 39.5 | 44 | 30 | 34 | 44 | 43 | 38 | 38 | 28 | 35 | 35 | 35 | 35 |
| $V_2O_5$ | 39.5 | 39 | 38 | 39 | 44 | 30 | 30 | 38 | 46 | 38 | 38 | 38 | 38 |
| $TeO_2$ | 20 | 15 | 30 | 25 | 10 | 25 | 30 | 20 | 20 | 20 | 20 | 20 | 20 |
| $Al_2O_3$ | 1 | 2 | 2 | 2 | 2 | 2 | 2 | 4 | 6 | 2 | 2 | 2 | 2 |
| ZnO | — | — | — | — | — | — | — | — | — | 5 | — | — | — |
| $Bi_2O_3$ | — | — | — | — | — | — | — | — | — | — | 5 | — | — |
| $Cu_2O$ | — | — | — | — | — | — | — | — | — | — | — | 5 | — |
| $Mo_2O_3$ | — | — | — | — | — | — | — | — | — | — | — | — | 5 |
| Transformation Point (°C.) | 260 | 261 | 270 | 267 | 270 | 268 | 273 | 278 | 281 | 273 | 270 | 275 | 279 |
| Softening Point (°C.) | 295 | 296 | 305 | 300 | 304 | 301 | 306 | 318 | 325 | 311 | 308 | 315 | 315 |
| Flowability | o | o | o | o | o | o | o | o | o | o | o | o | o |
| Coefficient of Thermal Expansion ($\times 10^{-7}/°C.$) | 108 | 105 | 114 | 110 | 103 | 117 | 115 | 109 | 102 | 109 | 111 | 107 | 110 |

TABLE 2

| | | 2-1 | 2-2 | 2-3 | 2-4 | 2-5 | 2-6 | 2-7 |
|---|---|---|---|---|---|---|---|---|
| Samples in | 1-1 | 55 | 55 | — | — | — | 70 | — |

TABLE 2-continued

| | | Sample No. | | | | | | (Vol. %) |
|---|---|---|---|---|---|---|---|---|
| | | 2-1 | 2-2 | 2-3 | 2-4 | 2-5 | 2-6 | 2-7 |
| TABLE 1 | 1-4 | — | — | 60 | 55 | 60 | — | 60 |
| Low thermal expansion ceramic fillers | $Pb_{0.75}.Ca_{0.25}.TiO_3$ | — | 35 | 40 | — | 30 | — | — |
| | $Pb.Ti_{0.7}.Fe_{0.2}.W_{0.1}.O_3$ | 20 | — | — | 35 | — | 30 | — |
| | $Pb.Ti_{0.5}.Fe_{0.25}.Nb_{0.25}.O_3$ | — | — | — | — | — | — | 40 |
| | $0.99SnO_2.0.01ZnO$ | 25 | — | — | 10 | 10 | — | — |
| | $SiZrO_4$ | — | 10 | — | — | — | — | — |
| Coefficient of Thermal Expansion ($\times 10^{-7}/°C.$) | | 68 | 65 | 65 | 67 | 70 | 75 | 69 |
| Sealing Temperature (°C.) | | 350 | 360 | 360 | 350 | 360 | 340 | 350 |

Table 2 shows examples of low temperature sealing glass compositions prepared by mixing low thermal expansion ceramic fillers with glass powder samples Nos. 1-1 and 1-4 from TABLE 1. These examples are referred to sealing glass compositions Nos. 2-1 to 2-7 according to the present invention.

Each of the sealing glass compositons Nos. 2-1 to 2-7 in Table 2 is seen to exhibit a low sealing temperature in the 340° C. to 360° C. range. The coefficients of thermal expansion for sealing glass compositions No. 2-1 to No. 2-5 and No. 2-7 were all in the 68 to $70 \times 10^{-7}/°$ C. range, while this coefficient for sealing glass composition No. 2-6 was $75 \times 10^{-7}/°$ C. These values are all close to the $70 \times 10^{-7}/°$ C. value for alumina and $85 \times 10^{-7}/°$ C. value for window glass plate.

These results show that the sealing characteristics of the sealing glass compositions of the present invention are good because the transformation point and softening point are low and the flowability is good, and when mixed with 20% to 50% by volume of low thermal expansion ceramic fillers, the desired coefficient of thermal expansion is obtained. Furthermore, these results show that sealing is possible at temperatures of 370° C. and lower.

The transformation points and coefficients of thermal expansion in TABLES 1 and 2 were obtaiend from a curve of thermal expansion values measured with a dilatometer. The softening points were measured by the DTA method. The flowability was measured by preparing a button with a 20 mm outer diameter and 5 mm height from each sealing glass composition sample of the present invention and heating this button to 350+ C. for 10 minutes. If the outer diameter of the button was 23 mm or greater following this heating operation, the flowability was judged to be good. An outer diameter of less than 23 mm indicated some crystallization and the sample was rejected. To measure the sealing temperature, a button was prepared in the same manner as outlined above and heated. The sealing temperature is the point at which the outer diameter of the button reaches 22 mm.

The low thermal expansion ceramic fillers shown in TABLE 2 were prepared in the following manner.

Preparation of $Pb_{0.75}.Ca_{0.25}.TiO_3$

Litharge, calcium carbonate, and titanium oxide were dry mixted in such a ratio that the mixture contained 64 wt. % of PbO, 5 wt. % of CaO, and 31 wt. % of $TiO_2$.

The thus obtained mixture was sintered at 1170° C. for 5 hours, cooled, powdered and passed through a 350 mesh stainless steel screen, whereby $Pb_{0.75}.Ca_{0.25}.TiO_3$ was prepared.

Preparation of $Pb.Ti_{0.7}.Fe_{0.2}.W_{0.1}.O_3$

Ltharge, titanium oxide, ferric oxide, and tungsten trioxide were dry mixed in such a ratio that the mixture contained 70 wt. % of PbO, 18 wt. % of $TiO_2$, 5 wt. % of $Fe_2O_3$, and 7 wt. % of $WO_3$, and sintered at 1100° C. for 5 hours, cooled, powdered and passed through a 350 mesh stainless steel screen, whereby $Pb.Ti_{0.7}.Fe_{0.2}.W_{0.1}.O_3$ was prepared.

Preparation of $Pb.Ti_{0.5}.Fe_{0.25}.Nb_{0.25}.O_3$

Litharge, titanium oxide, ferric oxide, and niobium pentoxide were dry mixed n such a ratio that the mixture contained 72 wt. % of PbO, 11 wt. % of $TiO_2$, 6 wt. % of $Fe_2O_3$, and 11 wt. % of $Nb_2O_5$, sintered at 1200° C. for 5 hours, cooled, powdered and passed through a 350 mesh stainless steel screen. whereby $Pb.Ti_{0.5}.Fe_{0.25}.Nb_{0.25}.O_3$ was prepared.

Preparation of $0.99SnO_2.0.01ZnO$

Stannic oxide and zinc oxide were dry mixed in such a ratio that the mixture contained 99 wt. % of $SnO_2$, and 1 wt. % of ZnO, sintered at 1480° C. for 16 hours, cooled, powedered, and passed through a 350 mesh stainless steel screen, whereby $0.99SnO_2.0.01ZnO$ was prepared.

Preparation of $SiZrO_4$

Natural zircon sand was subjected to a soda decompostion and the decomposed product was dissolved in hydrochloric acid, followed by repeated concentration crystallizaton, whereby zirconium oxychloride with an extremly low content of α-ray emittng substances such as uranium and thorium was obtained The thus obtained zirconium oxychloride was neutralized with an alkali, and then heated, whereby purified zirconium oxide ($ZrO_2$) was obtained.

This purified zirconium oxide, high grade silica powder, and ferric oxide were mixed in such a ratio that the mixture contained 66 wt. % of ZrO2, 32 wt. % of SiO2, and 2 wt. % of $Fe_2O_3$, sintered at 1400° C. for 16 hours, cooled, powedered, and passed through a 350 mesh stainless steel screen, whereby $SiZrO_4$ was prepared.

The low temperature sealing glass compositions of the present invention have an extremely low melting point and comprise a vitreous glass powder with superior sealing characteristics. In addition, by mixing with a low thermal expansion ceramic fillers, the coefficient of thermal expansion can be adjusted to a desired value, so that it is possible to seal a ceramic package or a display device or the like at a temperature below 370° C. without the application of a load.

What is claimed is:

1. A low temperature sealing glass composition comprising a glass powder consisting of 25 to 50% by weight of PbO, 25 to 50% by weight of $V_2O_5$, 10 to 35% by weight of $TeO_2$, 0.5 to 7% by weight of $Al_2O_3$, 0 to 10% by weight of at least one element selected from a group consisting of ZnO, $Bi_2O_3$ and $P_2O_5$, and 0 to 5% by weight of at least one element selected from a group consisting of $Cu_2O$, $WO_3$, $B_2O_3$, $SiO_2$, $Mo_2O_3$, $Nb_2O_5$, $Fe_2O_3$, $ZrO_2$, SrO and BaO, the sealing glass composition having a sealing temperature of 370° C. or less.

2. A low temperature sealing glass composition comprising
   (a) 50 to 80% by volume of a glass powder consisting of 25 to 50% by weight of PbO, 25 to 50% by weight of $V_2O_5$, 10 to 35% by weight of $TeO_2$, 0.5 to 7% by weight of $Al_2O_3$, 0 to 10% by weight of at least one element selected from a group consisting of ZnO, $Bi_2O_3$ and $P_2O_5$, and 0 to 5% by weight of at least one element selected from a group consisting of $Cu_2O$, $WO_3$, $B_2O_3$, $SiO_2$, $Mo_2O_3$, $Nb_2O_5$, $Fe_2O_3$, $ZrO_2$, SrO, and BaO, and
   (b) 20 to 50% by volume of low thermal expansion ceramic fillers, the sealing glass composition having a sealing temperature of 370° C. or less.

3. The low temperature sealing glass composition as claimed in claim 2, wherein said low thermal expansion ceramic fillers are selected from the group consisting of $PbTiO_3$, $Pb_{0.75}.Ca_{0.25}.TiO_3$, $Pb.Ti_{0.7}.Fe_{0.2}.W_{0.1}.O_3$, $SiZrO_4$, $Pb.Ti_{0.5}.Fe_{0.25}.Nb_{0.25}.O_3$, and $0.99SnO_2.0.01\text{-}ZnO$.

* * * * *